United States Patent [19]
Yanagisawa

[11] Patent Number: 5,870,249
[45] Date of Patent: Feb. 9, 1999

[54] MAGNETIC DISK DRIVE IN WHICH CHANGE IN DISTANCE BETWEEN MAGNETIC HEAD AND DISK IS MINIMIZED

[75] Inventor: Masahiro Yanagisawa, Tokyo, Japan

[73] Assignee: NEC Corporation, Japan

[21] Appl. No.: 919,637

[22] Filed: Aug. 28, 1997

Related U.S. Application Data

[63] Continuation of Ser. No. 514,240, Aug. 11, 1995, abandoned.

[30] Foreign Application Priority Data

Aug. 24, 1994 [JP] Japan ..................................... 6-199162

[51] Int. Cl.$^6$ .................................................. G11B 21/02
[52] U.S. Cl. .......................... 360/101; 369/177; 360/106
[58] Field of Search ........................... 369/177; 360/101, 360/75, 104, 109, 78.05, 106

[56] References Cited

U.S. PATENT DOCUMENTS

| | | | |
|---|---|---|---|
| 3,337,694 | 8/1967 | Nakamatsu | 360/101 |
| 4,974,105 | 11/1990 | Johnson | 360/101 |
| 5,128,820 | 7/1992 | Bronsvatch | 360/101 |
| 5,172,282 | 12/1992 | Ghose | 360/78.12 |

FOREIGN PATENT DOCUMENTS

| | | | |
|---|---|---|---|
| 62-89280 | 4/1987 | Japan . | |
| 63-9375 | 1/1988 | Japan . | |
| 2-18075 | 8/1990 | Japan | 360/78.05 |

OTHER PUBLICATIONS

Disk File with Rotating Head by Gross et al, IBM Tech Disc. Bull., vol. 22, No. 8B, Jan. 1980, p. 3807.

Compact Diskette Drive, IBM Tech. Disc Bull., vol. 30, No. 7, Dec. 1987, pp. 448–451.

*Primary Examiner*—Alan Faber
*Attorney, Agent, or Firm*—Hayes, Soloway, Hennessey, Grossman & Hage, P.C.

[57] ABSTRACT

A high-recording-density magnetic disk drive is provided which minimizes changes in the distance between a magnetic disk and a magnetic head and is reduced in size and weight. The magnetic head and a support spring which supports the magnetic head are rotated over the magnetic disk which is stationary, and a base which supports the support spring is rotated by a rotary actuator for tracking on the magnetic disk.

2 Claims, 5 Drawing Sheets

MAGNETIC DISK DRIVE IN WHICH CHANGE IN DISTANCE BETWEEN MAGNETIC HEAD AND DISK IS MINIMIZED

This is a continuation Ser. No. 08/514,240 filed Aug. 11, 1995, now abandoned.

BACKGROUND OF THE INVENTION

1. Field of the Invention

The present invention relates to a magnetic disk drive, and more particularly to a high-recording-density magnetic disk drive in which any change in the distance between the magnetic disk and the magnetic head is minimized and which is reduced in size and weight.

2. Description of the Related Art

Generally, in magnetic disk drives, a magnetic head is moved radially across a magnetic disk while the magnetic disk is rotating, for forming concentric recording tracks on the magnetic disk. The magnetic head is moved radially across the magnetic disk to reach and follow a desired recording track (a process known as tracking) by a linear actuator or a rotary actuator that is positioned radially outwardly of the magnetic disk.

As the recording density of magnetic disk drives increases, there is a demand for reducing the distance or spacing between the magnetic disk and the magnetic head. With the spacing reduced, however, the magnetic head tends to be unable to catch up with variations caused by oscillations of the motor which rotates the magnetic disk or undulations of the magnetic disk itself. When this happens, the magnetic head jumps off a desired recording track, with the result that spacing-induced fluctuations and output electric signals from the magnetic head are subject to large disturbances. Consequently, it has been difficult to increase recording density beyond a certain limit.

In order to reduce eccentricity of magnetic disks, it is necessary to increase the diameter of a bearing which supports the shaft of the motor. Therefore, it is difficult to reduce the inside diameter of the magnetic disk, and hence the size of the magnetic head.

Because the actuator for radially moving the magnetic head is positioned radially outwardly of the magnetic disk, the support spring or arm which supports the magnetic head must be made large or long and undergoes large inertial forces. The large inertial forces pose a large burden on the servo control system, making it difficult to effect high-speed tracking.

As a result, the conventional magnetic head drives have not been easy to reduce in size.

SUMMARY OF THE INVENTION

It is therefore an object of the present invention to provide a magnetic disk drive which is less susceptible to undulations of magnetic disks and can produce recording and reproduced output signals with reduced fluctuations.

Another object of the present invention is to provide a magnetic disk drive which is reduced in size.

According to the present invention, there is provided a magnetic disk drive comprising a magnetic disk held in a stationary condition, at least one magnetic head disposed over the magnetic disk, at least one support spring which supports the magnetic head, and means for rotating the support spring with respect to the magnetic disk.

One of the factors which prevents the reduction of spacing between the magnetic disk and the magnetic head is undulations of the magnetic disk surface, particularly undulations in a direction perpendicular to the magnetic disk surface. If the spacing is as large as 0.2 micrometer, then the magnetic head can follow the magnetic disk surface due to the spring action of air film that is interposed between the magnetic head and the magnetic disk. If the spacing is as small as 50 nanometers or less, then the magnetic head can no longer follow the magnetic disk surface, but is apt to be brought into intermittent contact with the magnetic disk surface, with the result that output electric signals from the magnetic head suffer large spacing-induced variations. As a consequence, the output electric signals from the magnetic head have increased error, and the magnetic disk or the magnetic head wears rapidly.

The magnitude of undulations of the magnetic disk surface corresponds to the sum of undulations which the magnetic disk itself has (hereinafter referred to as "static undulations") and undulations produced by the magnetic disk when it rotates (hereinafter referred to as "dynamic undulations"). Therefore, the magnitude of undulations of the magnetic disk increases when the magnetic disk rotates, and is very large particularly if the substrate of the magnetic disk is thin.

In the magnetic disk drive according to the present invention, however, since the magnetic disk is stationary, the magnitude of undulations of the magnetic disk does not increase beyond the magnitude of static undulations thereof. This is advantageous particularly if the magnetic disk is thin. The magnetic disk drive according to the present invention can thus be reduced in size if the magnetic disk is thin.

The torque required to rotate the magnetic head may be smaller than the torque required to rotate the magnetic disk. As a result, the motor used to rotate the magnetic head may be reduced in size, making it possible to further reduce the size of the magnetic disk drive.

Inasmuch as the motor can be reduced in size, the bearing which supports the shaft of the motor may also be reduced in size, and hence the inside diameter of the magnetic disk may be reduced. Therefore, the magnetic disk may have an increased recording area for an increased recording capacity. If the motor used to rotate the magnetic head is positioned on the side of a recording surface of the magnetic disk, then it is possible to eliminate the inside diameter of the magnetic disk. Actually, however, it is not practical for the magnetic disk to have a recording disk in a position where the speed of the magnetic head is zero.

One arrangement for rotating a magnetic head for use in a video tape recorder is disclosed in Japanese laid-open patent publication No. 63-9375. The disclosed mechanism is, however, not effective to reduce the spacing, the size, and the weight of a disk drive.

Japanese laid-open patent publication No. 62-89280 reveals that a magnetic head mounted on a rotatable body which is rotatable about a center different from the center about which a magnetic disk is rotatable is moved radially over the magnetic disk to effect tracking. Since the magnetic disk is not stationary, however, it is difficult to reduce undulations of the magnetic disk. Because the center of rotation of the magnetic disk and the center of rotation of the magnetic head are different from each other, it is not possible to keep the magnetic disk for recording information on and reproducing information from the magnetic disk. Furthermore, inasmuch as the center of rotation of the magnetic head is positioned radially outwardly of the magnetic disk, the size of the magnetic head cannot be reduced.

According to the present invention, the magnetic head and the support spring which supports the magnetic head are rotated over the magnetic disk which is stationary, and the base which supports the support spring is rotated by a rotary actuator for tracking on the magnetic disk. Therefore, it is possible to effect tracking on the magnetic disk even when the magnetic head rotates. The center of rotation of the support spring is positioned within the radius of the magnetic disk. Therefore, the length of the support spring may be made smaller, and the rigidity of the support spring may be stronger, so that the ability of the magnetic head to follow the surface of the magnetic disk may be increased, and the magnetic disk drive may be reduced in size.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
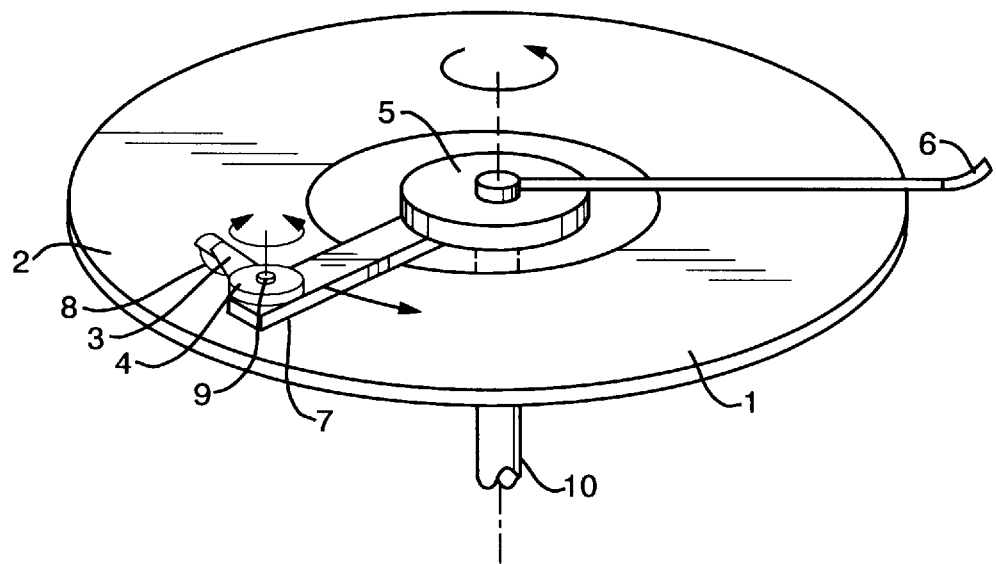
FIG. 1 is a schematic perspective view of a magnetic disk drive according to one embodiment of the present invention.

FIG. 1 schematically shows a magnetic disk drive according to one embodiment of the present invention.

As shown in FIG. 1, stationary magnetic disk 1 has a circular central opening defined therein, and a motor shaft 10 extends upwardly into the circular central opening. The motor shaft 10 is rotatable about an axis which is aligned with the central axis of the magnetic disk 1. A rotary connector 5 is mounted on the upper end of the motor shaft 10. A rotatable arm 7 is fixed at one end thereof to the rotary connector 5 and extends radially parallel to the upper surface of the magnetic disk 1.

On a free end of the rotatable arm 7, there is rotatably supported by a connector 9 a base which supports a support spring 3 that supports a magnetic head 2. A rotary actuator 4 is also mounted on the free end of the rotatable arm 7 for rotating the base around the connector 9.

Leads 8 extend from the magnetic head 2 through the rotatable arm 7 and the rotary connector 5, and are electrically connected to signal wires 6.

In the magnetic disk drive shown in FIG. 1, the rotatable arm 7 and the rotary actuator 4 are rotated with respect to the stationary magnetic disk 1 for the magnetic head 2 to effect tracking on the magnetic disk 1.

Figure 2:
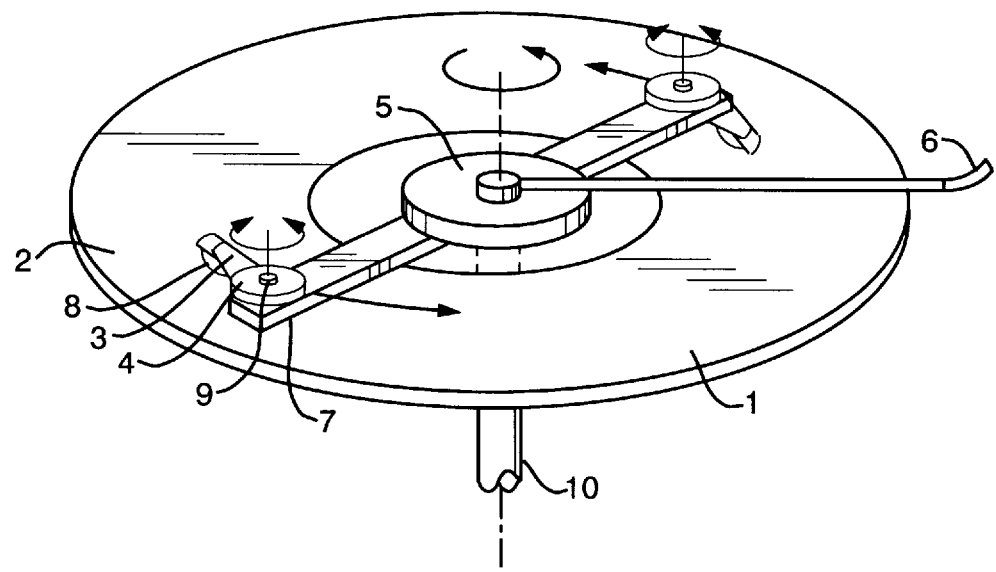
FIG. 2 is a schematic perspective view of a magnetic disk drive according to another embodiment of the present invention.

FIG. 2 schematically shows a magnetic disk drive according to another embodiment of the present invention. The magnetic disk drive shown in FIG. 2 is similar to the magnetic disk drive shown in FIG. 1 except that another rotatable arm identical to the rotatable arm 7 is attached to the connector 5 in diametrically opposite relation to, and in longitudinal alignment with, the rotatable arm 7, and an assembly identical to the assembly composed of the magnetic head 2, the support spring 3, and the rotary actuator 4 is mounted on the other rotatable arm.

In the magnetic disk drive shown in FIG. 2, the magnetic disk 1 has an outside diameter of 48 millimeters and an inside diameter of 12 millimeters. The magnetic disk 1 comprises a substrate of glass or aluminum alloy covered with an alloy of nickel and phosphorus, a thin magnetic film of an alloy of cobalt, platinum, and chromium disposed on the substrate, the thin magnetic film having a thickness of 50 nanometers, and a protective film of carbon disposed on the thin magnetic film and having a thickness of 10 nanometers.

When the magnetic disk shown in FIG. 1 was constructed magnetic disk 1 had static undulations (the difference between highest and lowest regions in one circumference) varying from 1 micrometer to 50 micrometers in a thickness ranging from 0.6 millimeter to 0.1 millimeter. The magnetic head 2 was in the form of a slider with a thin-film device composed of a sintered body of alumina and titanium carbide, and supported on the support spring 3 of stainless steel (T-16 manufactured by Hutchingson Inc.). The amount of floating of the magnetic head 2 was varied from 100 nanometers to 50 nanometers by varying the area of floating. The magnetic head 2 was rotated by the rotatable arm 7 and the motor shaft 10 at rotational speeds in the range of from several thousands rpm to fifty thousands rpm. The support spring 3 was attached to the rotary actuator 4, and the electric signals from the magnetic head 2 were transmitted through the leads 8, the connector 9, and the rotary connector 5 to the signal wires 6.

The degree R (the reciprocal of the ratio of the minimum peak to the maximum peak in one periodic wave-form) of disturbance of the amplitude of signals of recorded or reproduced waveforms was measured for the magnetic disk drive according to the present invention.

The degree R of disturbance of the amplitude of signals of recorded or reproduced, waveforms was also measured for comparison, using a conventional magnetic disk drive wherein the magnetic disk rotates, under the same conditions as the magnetic disk drive according to the present invention.

Figure 3:
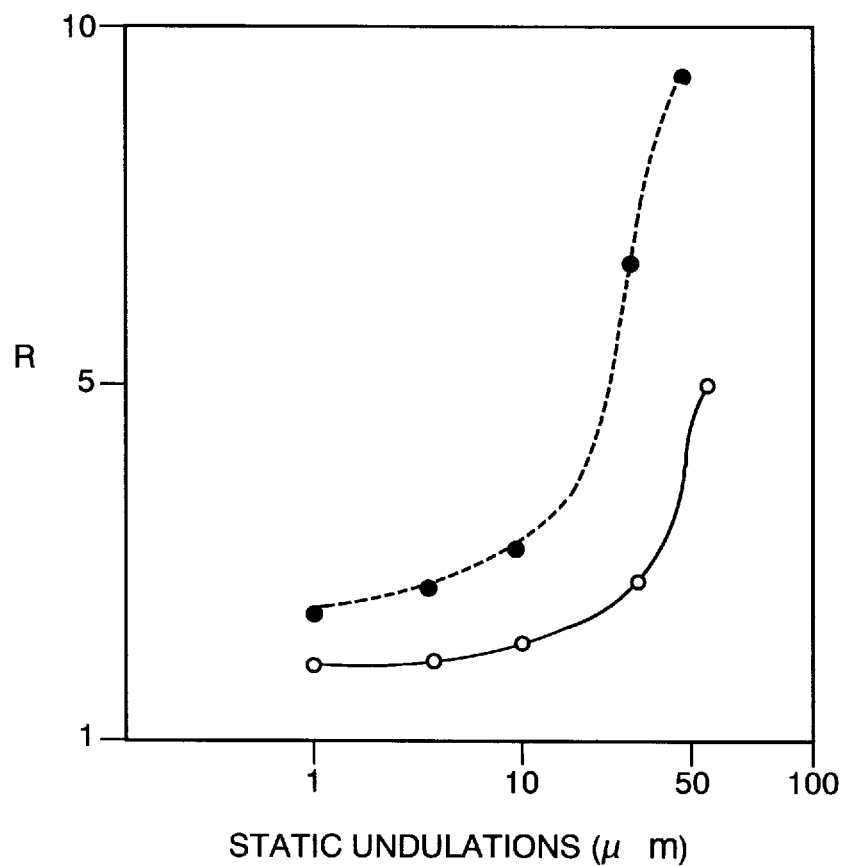
FIG. 3 is a diagram showing the relationship between the degree R of disturbance of the amplitude of signals and the static undulations in the magnetic disk drive according to the present invention and a conventional magnetic disk drive.

FIG. 3 shows the degree R as it depends on static undulations, measured when a magnetic disk of a thickness of 0.6 millimeter was used, the magnetic head was rotated at 5400 rpm, and the amount of floating thereof was 50 nanometers. The solid-line curve indicates the measured data of the magnetic disk drive according to the present invention, whereas the broken-line curve indicates the measured data of the conventional magnetic disk drive.

A study of FIG. 3 shows that the degree R of disturbance of the amplitude of signals increases as the undulations increase. This indicates that as the undulations increase, it is more difficult for the magnetic head to follow the magnetic disk surface. The dependency of the degree R on the undulations is smaller in the magnetic disk drive according to the present invention than in the conventional magnetic disk drive.

Figure 4:
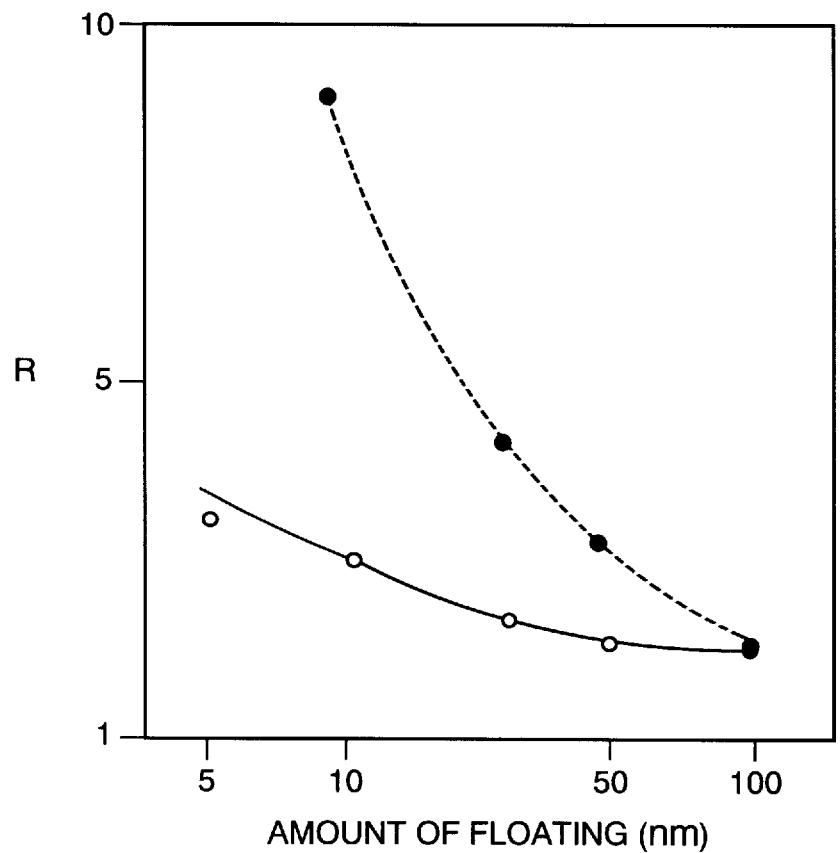
FIG. 4 is a diagram showing the relationship between the degree R of disturbance of the amplitude of signals and the amount of floating in the magnetic disk drive according to the present invention and the conventional magnetic disk drive.

FIG. 4 shows the degree R as it depends on the amount of floating, measured when a magnetic disk of a thickness of 0.6 millimeter was used, the magnetic head was rotated at 5400 rpm, and the static undulations were 10 micrometers. The solid-line curve indicates the measured data of the magnetic disk drive according to the present invention, whereas the broken-line curve indicates the measured data of the conventional magnetic disk drive.

An analysis of FIG. 4 reveals that the degree R of disturbance of the amplitude of signals increases as the amount of floating of the magnetic head decreases. This indicates that as the amount of floating of the magnetic head decreases, it is more difficult for the magnetic head to follow the magnetic disk surface. The effect that the degree R has on low amounts of floating is smaller with the magnetic disk drive according to the present invention than with the conventional magnetic disk drive.

Figure 5:
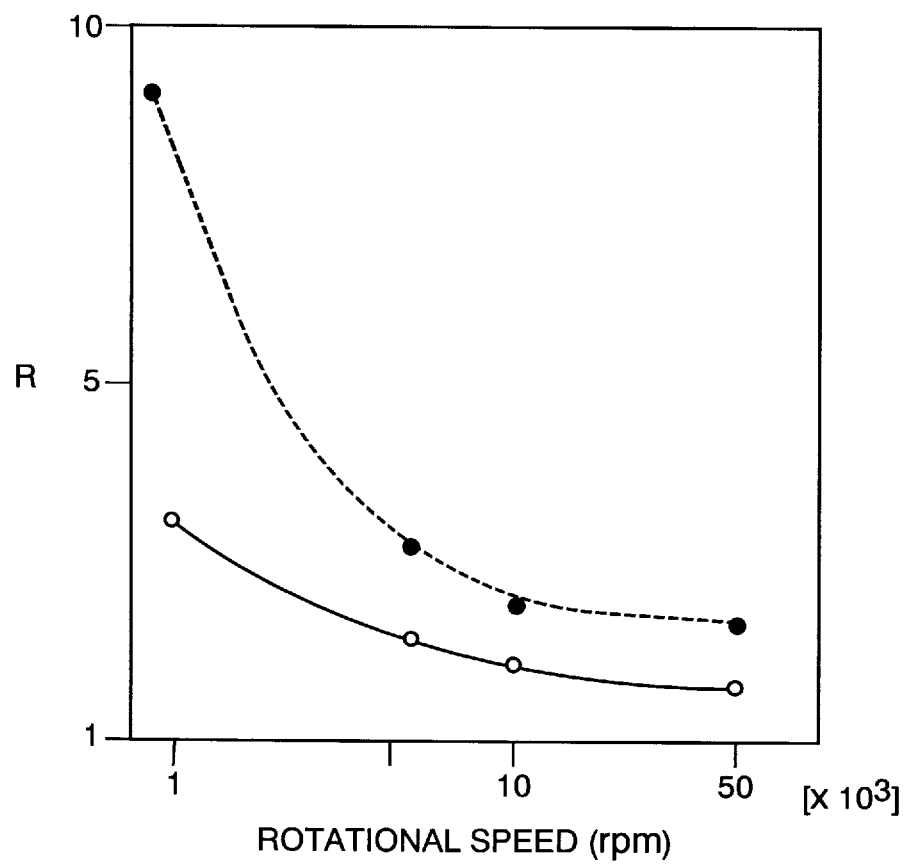
FIG. 5 is a diagram showing the relationship between the degree R of disturbance of the amplitude of signals and the rotational speed in the magnetic disk drive according to the present invention and the conventional magnetic disk drive.

FIG. 5 shows the degree R as it depends on the rotational speed of the magnetic head, measured when the magnetic disk of a thickness of 0.6 millimeter was used, and the static undulations were 10 micrometers. The solid-line curve indicates the measured data of the magnetic disk drive according to the present invention, whereas the broken-line curve indicates the measured data of the conventional magnetic disk drive.

It can be seen from FIG. 5 that as the rotational speed of the magnetic head of the conventional magnetic disk drive increases, the amount of floating increases, the dynamic undulations increase, and the degree R increases, and as the rotational speed of the magnetic head of the magnetic disk drive according to the present invention increases, the degree R remains substantially unchanged.

Figure 6:
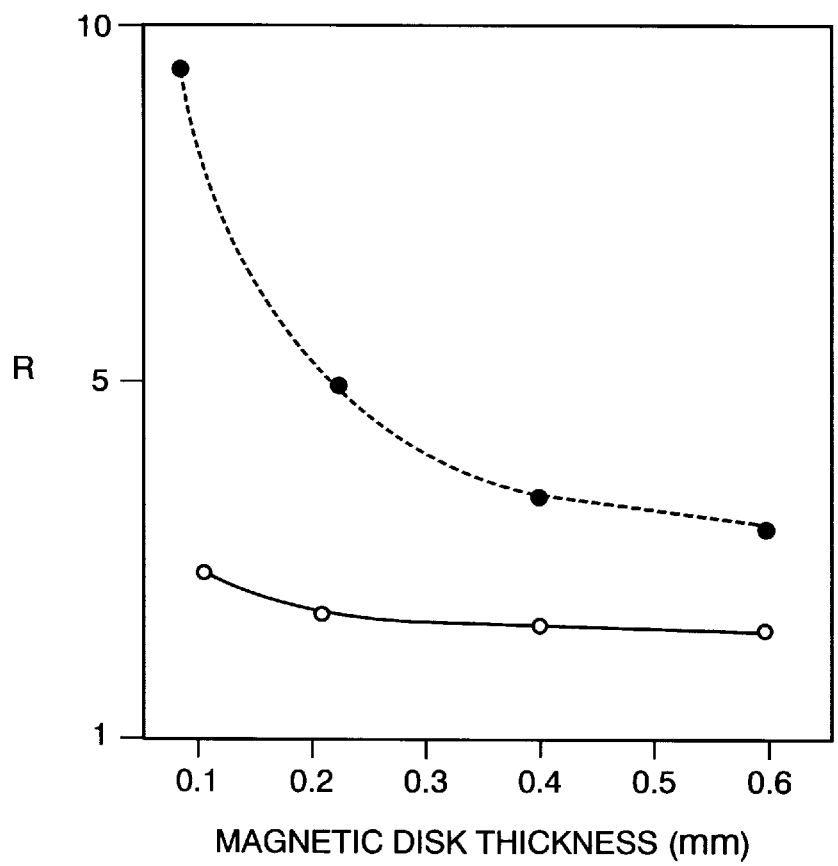
FIG. 6 is a diagram showing the relationship between the degree R of disturbance of the amplitude of signals and the magnetic disk thickness in the magnetic disk drive according to the present invention and the conventional magnetic disk drive.

FIG. 6 shows the dependency of the degree R on the magnetic disk thickness, measured when the magnetic head was rotated at 5400 rpm, the amount of floating was 50 nanometers, and the static undulations were 10 micrometers. The solid-line curve indicates the measured data of the magnetic disk drive according to the present invention, whereas the broken-line curve indicates the measured data of the conventional magnetic disk drive.

A study of FIG. 6 indicates that as the magnetic disk thickness decreases, the degree R of the magnetic disk drive according to the present invention increases only slightly, whereas the degree R of the conventional magnetic disk drive increases sharply.

When the inside diameter of the magnetic disk in the magnetic disk drive according to the present invention was reduced from 12 mm to 5 mm, the recording area of the magnetic disk was increased by 2.7%. With the magnetic disk drive being reduced in size and weight by using the rotatable magnetic head, the motor torque required was reduced by 20%. With the magnetic disk being reduced in thickness, the motor reduced in size, and the bearing reduced in size, the volume of the magnetic disk drive was reduced by 30%. Because the recording density was increased and the recording area was increased due to reduction in the amount of floating of the magnetic head, the recording capacity of the magnetic disk drive was increased by 35 times.

The magnetic disk drive with one magnetic head shown in FIG. 1 has a slightly poorer balance than the magnetic disk drive with two magnetic heads shown in FIG. 2. Therefore, the degree R of disturbance of the amplitude of signals of the magnetic disk drive shown in FIG. 1 is about 10% larger than of the magnetic disk drive shown in FIG. 2, but was at least 20% smaller than that of the conventional magnetic disk drive.

In the present invention, as described above, the magnetic head and the support spring which supports the magnetic head are rotated over the magnetic disk which is stationary, and the base which supports the support spring is rotated by the rotary actuator for tracking on the magnetic disk. The effect which the undulations of the magnetic disk have on signals is reduced, and any variations in recorded and reproduced output signals are reduced. The amount of floating of the magnetic head is reduced, and the recording density is increased. The magnetic head can be reduced in size and weight, and the magnetic disk can be reduced in weight. The inside diameter of the magnetic disk can be reduced, and the motor and the bearing can be reduced in size, with the result that the recording capacity of the magnetic disk drive can be increased, and the size of the magnetic disk drive can be reduced.

Although certain preferred embodiments of the present invention have been shown and described in detail, it should be understood that various changes and modifications may be made therein without departing from the scope of the appended claims.

What is claimed is:

1. A magnetic disk drive comprising:

a magnetic disk held in a stationary condition;

two magnetic heads disposed over one surface of said magnetic disk;

first and second support springs for supporting said magnetic heads, respectively;

a shaft rotatable about an axis aligned with a central axis of said magnetic disk;

a first arm fixed to said shaft and extending over said surface of said magnetic disk;

a first rotary actuator supported on a free end of said first arm;

a second arm fixed to said shaft and extending over the surface of said magnetic disk;

a second rotary actuator supported on a free end of said second arm;

said first support spring being supported on a base fixed to said first rotary actuator; and said second support spring being supported on a base fixed to said second rotary actuator;

wherein said magnetic heads have a common center of rotation over said magnetic disk, said common center of rotation coinciding with a center of said magnetic disk and also wherein said first and second rotary actuators have respective centers of rotation which are above a data recording area of said one surface of said magnetic disk.

2. A magnetic disk drive according to claim 1, wherein said first arm and said second arm are fixed to said shaft in longitudinal alignment with each other.

* * * * *